(12) United States Patent
Cookson

(10) Patent No.: US 10,261,407 B1
(45) Date of Patent: Apr. 16, 2019

(54) LIGHTED DOMED ANIMATION ILLUSION TOY, DISPLAY DEVICE, OR THE LIKE

(71) Applicant: Leslie Bennett Cookson, Lincoln, CA (US)

(72) Inventor: Leslie Bennett Cookson, Lincoln, CA (US)

( * ) Notice: Subject to any disclaimer, the term of this patent is extended or adjusted under 35 U.S.C. 154(b) by 0 days.

(21) Appl. No.: 15/954,586

(22) Filed: Apr. 16, 2018

(51) Int. Cl.
*G03B 25/00* (2006.01)
*F21V 14/08* (2006.01)
*G09F 19/12* (2006.01)
*A63H 33/22* (2006.01)

(52) U.S. Cl.
CPC ............. *G03B 25/00* (2013.01); *A63H 33/22* (2013.01); *F21V 14/08* (2013.01); *G09F 19/12* (2013.01)

(58) Field of Classification Search
CPC ........ G03B 25/00; G03B 21/562; F21V 14/08; G02B 27/2285; G09F 19/12; G09F 11/06
See application file for complete search history.

(56) References Cited

U.S. PATENT DOCUMENTS

| 972,344 | A | * | 10/1910 | Davis | G03B 21/32 |
| 2,913,954 | A | * | 11/1959 | Morgan | A63J 15/00 |
| | | | | | 352/2 |
| 6,097,468 | A | * | 8/2000 | Muehlenhard | G03B 25/00 |
| | | | | | 352/101 |
| 2013/0188342 | A1 | * | 7/2013 | Lin | F21V 23/04 |
| | | | | | 362/186 |

* cited by examiner

*Primary Examiner* — Ryan D Howard

(57) ABSTRACT

An improved zoetrope animation illusion toy or device that includes an internally lit slitted polygonal or round dome that rotates to create two-dimensional and/or three-dimensional animation illusions. Several means of holding arrange subjects of animation on the top surface of said base and/or within dome. Methods of operation by hand spinning, hand-crank, or motor. Methods of constructing the same.

14 Claims, 1 Drawing Sheet

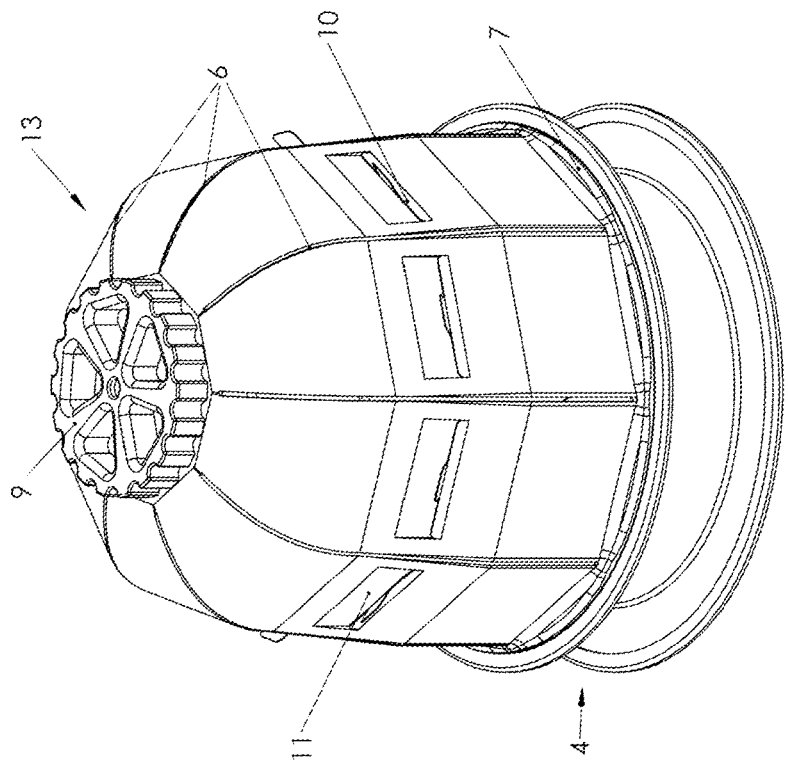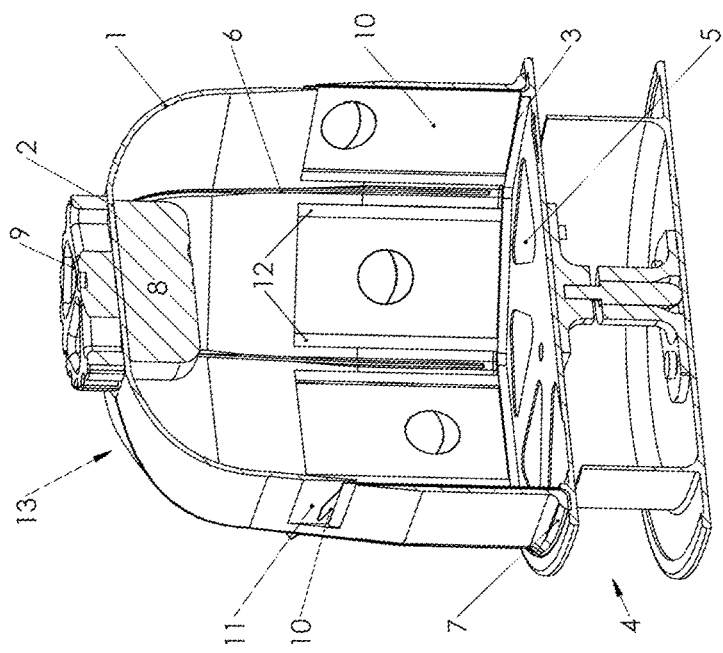

LIGHTED DOMED ANIMATION ILLUSION TOY, DISPLAY DEVICE, OR THE LIKE

CROSS-REFERENCED TO RELATED APPLICATION

This present application claims the benefit of provisional patent application Ser. No. 62/485,842, filed Apr. 14, 2017 by the present inventor, which is incorporated by reference in its entirety.

The present invention relates generally to systems and methods for two-dimensional and/or three-dimensional animation. Stated more particularly, disclosed herein are a system for producing two-dimensional and/or three-dimensional animation and a method using the same wherein two-dimensional animation cards and disc, and/or three-dimensional animation objects or toys are rotated to produce an impressive and interactive animation illusion.

BACKGROUND ART

Going far back into history mankind has created toys and devices that create or attempt to create the illusion of motion or animation. In the nineteenth century we saw the invention of the zoetrope U.S. Pat. No. 64,117 to Lincoln, 1867 Apr. 23, which while not the first such device, did much to popularize the seeming magic of seeing drawings appear to move and come to life. This original zoetrope operated by means of a slotted hollow cylinder, or drum, containing animation strips and discs that spin on a stand. By viewing the spinning animation through slits in the drum, the blur of color is broken into a rapid succession of sequential images producing the illusion of motion. But the view through small slits on the side of a drum offered a very limited viewing angle, and said Lincoln's design depended on ambient light cast through the top of the open cylinder to light the animation strips, which resulted in a poorly lit view of the animation.

There is known in the prior art many iterations and improvements on said Lincoln's zoetrope such as U.S. Pat. No. 972,344A to Davis, 1909 Oct. 4, U.S. Pat. No. 1,925,136A to Harvey, 1930 Nov. 28, U.S. Pat. No. 9,475,536B1 to Hancock, 2015 Aug. 26. To address the issue of poor lighting in a zoetrope design relying on ambient light, there are known in the prior art examples of electric lights being placed inside the zoetrope drum such as U.S. Pat. No. 2,538,407A to Allen, 1946 Feb. 6, patent EP1081543A1 to Ecosse, 1999 Aug. 31, and patent DE202005013118U1 to Lorenz, 2005 Aug. 19. The present inventor has also designed and built classically styled zoetropes with electric lights to illuminate the animation therein, which can be viewed at www.ZOEFLIX.com. While these iterations and improvements addressed some drawbacks of said Lincoln's original zoetrope, or take it in one new direction or another, there is still much that could be done and improved in this area.

There is also known in the prior art a dome shaped toy top utilizing a moving picture apparatus, which is U.S. Pat. No. 3,640,019A to Jones, Schmidt, and Smith, 1970 Feb. 9. The embodiment mentioned in said toy top patent that provided a means for lighting the interior of said toy top is by constructing the dome of transparent materials with a plurality of dark surfaces intermittently spaced about the periphery thereof to form viewing slots. The rest of the dome is left clear to enable ambient light to enter therethrough to illuminate the pictures within said toy top's dome interior. This reliance on ambient light through the partially clear and partially obscured dome retains, if not exacerbates, the problem of poor lighting in said Lincoln's original zoetrope. Further, I have found through my own experimentation that said clear dome with intermittently spaced dark surfaces to form viewing slots is an inferior construction to open or cut away slits. This is because viewing the animation through transparent material interferes with the view of animation because of glare reflection off both sides of the transparent material.

SUMMARY OF THE EMBODIMENTS

Embodiments include an internally lit slitted polygonal or round dome or the like that is rotated to create two-dimensional and/or three-dimensional animation illusions. Several means of holding or fixing arrange subjects of animation. Embodiments may be spun by hand, hand-crank, or motor on a rotating base or suspended from a cord or string. Embodiments can be constructed in numerous ways including injection molded plastic, folded or rolled flat material, or built with an assortment of interlocking bricks.

BRIEF DESCRIPTION OF THE DRAWINGS

FIG. 1 is a cross-sectional perspective view of an embodiment.

FIG. 2 is a perspective view of said embodiment.

DETAILED DESCRIPTION OF SPECIFIC EMBODIMENTS

Where as prior art zoetropes took this device in many directions and even provided some improvements, none of them pull together the synergistic combination of features that make the present embodiments a more profound or comprehensive solution. One or more aspects of my embodiments provide a system and method of building an animation toy, device, or the like that creates an image that is bright and sharp, can be viewed at a wider range of angles, easily accessible for customization of animation illusion, and simple to manufacture. I have found when constructing zoetrope type devices that there is a correlation between the slit width used in an embodiment and the resulting animation illusion brightness, and an inverse correlation between slit width and animation sharpness: the wider the brighter, the narrower the sharper. Providing a light to illuminate the animation illusion combined with an embodiment with narrow slits has a synergistic effect resulting in an animation illusion that is both bright and sharp. The placement of slits along a dome, rather than the traditional cylinder, allows a sweeping view of the animation illusion from a much wider range of angles. A removable dome covering and/or containing the subjects of animation allows easier access and customization. The subjects of animation are any sequenced two-dimensional and/or three-dimensional cards, discs or objects. Said subjects of animation can be arranged freely without the necessity of reaching into or around the walls of said dome, then once ready said dome is placed over prepared said subjects of animation. And the plurality of slits in a hollow dome construction allows for simpler production and mold construction if the embodiments are built with an injection molding process, as a domed shape allows the mold features making the slits to pass through the dome without dissecting it. This and other benefits of one or more aspects will become apparent from a consideration of the ensuing description and accompanying drawings.

Animation illusion toy, display device, or the like 13 is shown in FIGS. 1 and 2. Embodiments provide an opaque hollow dome, domed or closed type of cylinder, truncated cone, or bell-shaped body with a profile or form that is round, polygonal, or some combination round and polygonal, referred to herein as dome 1. If said dome 1 is round in profile or in form, it is fashioned into a more conventional dome like shape. If said dome 1 is a polygonal dome that could include a plurality of faceted sides and corners converging in a gradual or stepped manner inwardly towards the top thereof as shown in FIGS. 1 and 2. Any part or portion of said dome 1 may be round or polygonal as set forth, or any combination thereof. Said dome 1 has a closed top 2 opposite a wider open end 3. Said open end 3 may have a protrusion, flange, or brim 7 around its circumference or any part thereof. Said open end 3 does not of necessity have to be wider than closed top 2. The opening of said open end 3 can be round or polygonal or some other shape.

Said dome 1 has a plurality of slits 6 equally spaced vertically around the periphery thereof. Said plurality of slits 6 can run in length any portion of the distance along the vertical height of said dome 1 from said closed top 2 vertically down the periphery of said dome 1 approaching, but not dissecting said open end 3 and/or said brim 7. Thus allowing said dome 1 to keep its structural integrity, held together by said closed top 2 and at least the outermost portion of said open end 3 and/or said brim 7, while being severally dissected along large portions of its periphery by said plurality of slits 6. Said open end 3 and/or said brim 7 may alternatively be dissected by said plurality of slits 6 if sufficient material or support strength is built into the walls of said dome 1 such that they can hold their shape and function while only being attached at one end near or at said closed top 2. The more distance along the vertical height of said dome 1 said plurality of slits 6 traverses or passes through, the fuller and wider will be the angles of user's view of any subjects of animations place within said dome 1; thus said plurality of slits 6 should be made as tall as possible without compromising the total structural integrity of said dome 1.

Said plurality of slits 6 can be beveled on the edges facing the inside of said dome 1 to increase field of view as the eye scans through said plurality of slits 6 at said subjects animation placed inside said dome 1 and/or on said animation surface 5. The walls of said dome 1 may, instead or in addition to described beveling said plurality of slits 6, may be thin at the locations of said plurality of slits 6 or in whole to increase field of view as the eye scans through said plurality of slits 6 as stated above. As there is an inverse correlation between said plurality of slits 6 width and animation sharpness, thus said plurality of slits 6 should be narrow to allow a sharper view of animation. The said plurality of slits 6 may be approximately 1/16 inch wide, but said plurality of slits 6 may be approximately between 0.04 and 0.1875 inch wide.

Said dome 1 connects with and spins on a spinning platform, turntable, or a rotatable base 4 with a surface or area on the top thereof to hold said subjects of animation, referred to herein as an animation surface 5 as shown in FIG. 1. On the outer surface of said closed top 2 there can be attached any type of handle, knob, or mode of spinning with a hole or holes or a other similar grip feature 9 as a convenient handle to spin or rotate said dome 1 on said rotatable base 4, as shown in FIGS. 1 and 2. Alternatively, said dome 1 on said rotatable base 4 may be spun or rotated my means of any sort of hand crank, an electric motor(s), or other means of spinning or rotating.

Said brim 7 can serve to strengthen said open end 3 and allow for simpler injection molding of said dome 1 as it can allow mold details making said plurality of slits 6 to pass through said dome 1 without said dome 1 being dissected thereby. The side walls of said dome 1 may continue up straight (with allowance for draft when injection molding) from said open end 3 for a distance before wall starts to taper into a dome shape or other taper or angle before dome taper or shape near or at said closed top 2. The taper from said open end 3 to said closed top 2 may be continuous, stepped, or otherwise non-continuous. Said dome 1 taper may alternatively be replaced or combined with one or more inward angular planes or surfaces to adjust dome diameter inward towards closed top 2. Said closed top 2 can be completely domed, or flattened so that said closed top 2 is plateaued or truncated with a flat surface on the top thereof. Said flattened surface of said closed top 2 can accommodate a light 8 that is attached to the bottom surface of said closed top 2 such that said light 8 is within the hollow of said dome 1 and able to illuminate said subjects of animation placed within said dome 1 and/or on said animation surface 5.

Alternatively an embodiment could provide construction of said dome 1 by rolling or folding a laser-cut, die cut, stamped or otherwise shaped or cut sheet of material into a hollow truncated cone or dome like shape by conventional cone making means. Said material could be paper, a flexible plastic, metal, or some other similar material. In this embodiment said closed top 2 may be a smaller open end at the top of said truncated cone opposite said wider open end 3, wherein to said opening said light 8 may be placed or fixed.

Alternatively, said dome 1 instead of being spun on said rotatable base 4, can be suspended by a cord, rope, string, or the like connected to said closed top 2 and/or said grip feature 9. Thus suspended by said cord being fixed or held by some structure, object or person, said dome 1 may be spun by hand, motor, wind-power, or some other means. This embodiment may include an alternative to said animation surface 5, which is not part of a rotating base, but acts only as a surface to hold said subjects of animation and connects to said open end 3 as set forth.

Said animation surface 5 on the top said of rotatable base 4 can be round or polygonal or some other shape that will match and mate with the profile of said open end 3 such that said dome 1 can connect over said animation surface 5 and stay engaged with said rotatable base 4 during use. The connection of said dome 1 over said animation surface 5 may be facilitated by any conventional or new means of snapping or locking with some type of conventional locking, tab and slot connection, interference fit means, or another in such a way that said dome 1 can be connected in placed over said animation surface 5 and removed and replaced many time during use.

Said dome 1 has a plurality of slits 6 equally spaced vertically around the periphery thereof. Said plurality of slits 6 can run in length any portion of the distance along the vertical height of said dome 1 from said closed top 2 vertically down the periphery of said dome 1 approaching, but not dissecting said open end 3 and/or said brim 7. Thus allowing said dome 1 to keep its structural integrity, held together by said closed top 2 and at least the outermost portion of said open end 3 and/or said brim 7, while being severally dissected along large portions of its periphery by said plurality of slits 6. Said open end 3 and/or said brim 7 may alternatively be dissected by said plurality of slits 6 if sufficient material or support strength is built into the walls of said dome 1 such that they can hold their shape and function while only being attached at one end near or at said closed top 2. The more distance along the vertical height of said dome 1 said plurality of slits 6 traverses or passes through, the fuller and wider will be the angles of user's view of any subjects of animations place within said dome 1; thus said plurality of slits 6 should be made as tall as possible without compromising the total structural integrity of said dome 1.

Said plurality of slits 6 can be beveled on the edges facing the inside of said dome 1 to increase field of view as the eye scans through said plurality of slits 6 at said subjects animation placed inside said dome 1 and/or on said animation surface 5. The walls of said dome 1 may, instead or in addition to described beveling said plurality of slits 6, may be thin at the locations of said plurality of slits 6 or in whole to increase field of view as the eye scans through said plurality of slits 6 as stated above. As there is an inverse correlation between said plurality of slits 6 width and animation sharpness, thus said plurality of slits 6 should be narrow to allow a sharper view of animation. Said plurality of slits 6 may be approximately 1/16 inch wide, but said plurality of slits 6 may be approximately between 0.04 and 0.1875 inch wide.

The quantity of said plurality of slits 6 may range in number. If said dome 1 is polygonal in shape, wherein said open end 3 and at least part of the wall of said dome 1 form a polygonal profile, which profile may start at said open end 3 and continuing up at least part of the wall of said dome 1 forming a hollow polygonal dome or hollow cylindrical polygon with a domed said closed top 2 opposite the polygonal said open end 3, then said plurality of slits can be located along each of the vertical corners of the polygonal profile of said dome 1, as shown in FIGS. 1 and 2.

Nine (9) said plurality of slits 6 may be used in order to find an adequate balance between animation frames and range of motion that increases with each additional said plurality of slits 6, and space for and ease of creating and arranging subjects of animations that decreases with each additional said plurality of slits 6. Nine (9) said plurality of slits 6 is enough frames to show an adequately fluid animation, yet still only uses an eight (8) or nine (9) frame 2-dimensional and/or 3-dimensional sequence for animation. This embodiment can allow for more room for each frame and may be a more manageable number of frames for a user and/or younger user to arrange and/or create. Said plurality of slits 6 may alternatively number (3), four (4), five (5), six (6), seven (7), eight (8), ten (10), eleven (11), Twelve (12), or more depending on the application and desired effect.

The outside surface of said dome 1 should be black or dark in color to maximize visibility of the animation illusion. The inside surface of said dome 1 can be white or light in color to maximize brightness of the animation illusion, or the inside surface of said dome 1 can be black or dark in color to match the color of the outside surface of said dome 1.

The embodiments can range in size, but to give a sense of scale and proportion, I will disclose some example size and scale. The diameter of the round or polygonal said open end 3 can be between approximately 5 inches and 12 inches, and the height of said dome 1 can be between approximately 5 inches and 12 inches. The diameter of the round or polygonal said open end 3 may be larger, smaller, or approximately the same as the distance of the height of said dome 1. The difference in length between said open end 3 diameter and said dome 1 height may be within 25%. Said dome 1 may be smaller or larger and keep approximately the same proportions as stated above or it may be made with different proportions.

Said light 8 can be a battery powered light or lights. Said light 8 may be a LED (light emitting diode) light. If said light 8 is a wide angle light or flood light that will provide for a brighter and fuller lighting of the animation illusion. Said light 8 can have the ability to turn off by conventional means, or said light 8 can be integrated with said closed top 2 and/or said grip feature 9 to switch off and on without accessing the interior of dome. Alternatively, a light or lights may be placed anywhere within said dome 1 or on said top surface 5.

A flat round card or polygonal animation disc with sequenced drawings suitable for animation may be placed on said animation surface 5. And a plurality of cards 10 with sequential drawings are inserted into a plurality of slots 11 such that said plurality of cards 10 insert against and are visible around the inner surface of the hollow inside of said dome 1 as shown in FIG. 1. Said plurality of slots 11 feed said plurality of cards 10 into a plurality of channels 12, which help direct and hold said plurality of cards 10 down and against the inner surface of the hollow inside of said dome 1 as shown in FIG. 1. Alternatively, said plurality of cards 10 may be placed on a plurality of vertical stands on said animation surface 5. With this alternative, said plurality of cards 10 and said animation discs may alternatively be made in one piece with said plurality of cards 10 connecting on one send to the side of a polygonal said disc.

If said dome 1 and said animation surface 5 are polygonal then, said animation disc should match their polygonal shape. If the sides of said dome 1 are generally polygonal in shape or form, then one said plurality of slots 11 can be placed in each facet or side of said dome 1 such that the number of said plurality of slots 11 equals the sides of the polygonal said dome 1 as shown in FIGS. 1 and 2. The polygonal said dome 1 embodiment with a plurality of sides going around said dome 1 provides flat surfaces to place said plurality of slots 11 to receive said plurality of cards 10. With said polygonal embodiment the bottoms of said plurality of cards 10 inserted into said plurality of slots 11 and held with said plurality of channels 12 can line up with the several sides of the polygonal said animation surface 5 and thus line up with the polygonal said animation disc placed on said animation surface 5. Being thus aligned the animation sequences on said animation disc may be made to correspond or interact conceptually with the animation sequences on said plurality of cards 10 as their orientation relative to each other will remain constant while embodiment spins. For example, an animator could draw elements on said animation disc that seem to continue off said animation disc up onto said plurality of cards 10 facilitated by one or more frame(s) wherein animation elements are shown partly on said animation disc and partly on one or more of said plurality of cards 10. This type of coordination could only be accomplished if the said animation disc and said plurality of cards 10 keep the same orientation while in use. Said plurality of cards 10 can be made to any height that will fit in said dome 1. It is best if said plurality of cards 10 do not block any portion of said plurality of slits 6. In order to make said plurality of cards 10 taller without interfering with said plurality of slits 6, said plurality of cards 10 may be tapered towards the top to stay in between said plurality of slits 6 when and if said dome 1 tapers and space between said plurality of slits 6 become narrower towards the top thereof.

OPERATION

One embodiment can be operated as a toy. The user arranges said plurality of cards 10 with sequential drawings in said plurality of slots (or in said plurality of vertical stands). On said animation surface 5, the user places and/or arranges said animation disc and/or three-dimensional objects in sequence suitable for animation such as toys, figures, clay objects, and much more. The user switches on said light 8 to illuminate the interior of said dome 1, and user connects said dome 1 over said animation surface 5 as set forth. The user then spins said dome 1 on said rotatable base 4 by means of turning said grip feature 9 and/or running hand along the side of said dome 1 to rotate, or my any other means including but not limited to means set forth such as motor powered, hand crank, or being suspended from a cord as set forth. The user then looks at said dome 1 from a wide range of angles to view and enjoy the animation illusion. The user may dim the lights in the room to get a more impressive view of the animation illusion. Means to play sound effects or music could also be employed to enhance play.

Another embodiment is as a display piece or display illusion. Said subjects of animation within said dome 1 may be removable and replaceable as set forth with said plurality of cards 10, said animation disc, and/or removable and configurable three-dimensional objects. Or said subjects of animation can be configured by the manufacture and/or assembled by the user to be permanently or semi-permanently setup within said dome 1. An example of one such animation configuration could be to apply sequenced flame images on the inside wall of said dome 1, and configure on said animation surface 5 sequenced three-dimensional firewood sculptures. Thus the resulting illusion when spun and illuminated would have the effect and look of a glowing fire. Means to play sound effects or music could also be employed to enhance ambiance. The connection of said open end 3 to said animation surface 5 may be easily connected and disconnected as set forth so illusions can be interchanged, or permanently or semi-permanently connected. Any means of spinning said rotatable base 4 may be used (including being suspended from a cord as set forth), but the use of a motor will provide hands-free enjoyment of this embodiment from a range of distances. The user thus turns on said light 8 and motor to spin the embodiment, and enjoys the illusion at their leisure. The user may dim the lights in the room to get a more impressive view of the animation illusion, and the embodiment may additionally function as an atmospheric room light.

What is claimed is:

1. An animation illusion device comprising:
   a hollow dome with a top, a plurality of slits, a light, an animation surface, and subjects of animation;
   wherein the plurality of slits are spaced vertically around a periphery of the dome, wherein the light is disposed within the dome to illuminate the interior of the dome, wherein the subjects of animation are disposed on the animation surface, wherein the dome fits over the animation surface, wherein the animation surface with the subjects of animation covered by the dome have means by which the animation surface, the subjects of animation, and the dome can be rotated together, and wherein the plurality of slits function as shutters whereby, upon rotation, the subjects of animation, when viewed through the plurality of slits, create an illusion of natural and continuous animation;
   a cord, wherein the cord is connected to the top of the dome, and wherein the dome together with the animation surface and the subjects of animation are adapted to be suspended by the cord and, with the dome, the animation surface, and the subjects of animation being thus suspended, the cord is the means by which the animation surface, the subjects of animation, and the dome can be rotated together.

2. The animation illusion device of claim 1, wherein the plurality of slits being spaced vertically around the periphery of the dome a traverse more than half a distance along a vertical height of the dome.

3. The animation illusion device of claim 1, wherein the dome has a closed top opposite an open end.

4. An animation illusion device comprising:
   a hollow dome with a top, a hollow inside the dome, and an inner surface;
   a plurality of slits;
   a light;
   an animation surface;
   and subjects of animation;
   wherein the plurality of slits are spaced vertically around a periphery of the dome, wherein the light is disposed within the dome to illuminate the interior of the dome, wherein the subjects of animation are disposed on the animation surface, wherein the dome fits over the animation surface, wherein the animation surface with the subjects of animation covered by the dome have means by which the animation surface, the subjects of animation, and the dome can be rotated together, and wherein the plurality of slits function as shutters whereby, upon rotation, the subjects of animation, when viewed through the plurality of slits, create an illusion of natural and continuous animation;
   a plurality of slots; and a plurality of cards, wherein the plurality of slots are arranged around the dome horizontally between the plurality of slits, and the plurality of cards are inserted into the plurality of slots such that the plurality of cards pass into the dome against and around the inner surface of the hollow inside of the dome.

5. The animation illusion device of claim 4 further comprising a rotatable base with a top, wherein the animation surface is connected to the top of the rotatable base, and the rotatable base is the means by which the animation surface, the subjects of animation, and the dome can be rotated together.

6. The animation illusion device of claim 5, wherein the dome connects, locks, or fits over the animation surface connected to the top of the rotatable base.

7. The animation illusion device of claim 4, wherein the light is attached to the top of the dome within the hollow inside the dome.

8. The animation illusion device of claim 4 further comprising a motor, wherein the motor is operative to drive rotation of the animation surface, the subjects of animation, and the dome.

9. The animation illusion device of claim 4, wherein the dome is one body or joined permanently or semi-permanently with the animation surface.

10. The an illusion device of claim 4, wherein the plurality of slits are nine in number.

11. The animation illusion device of claim 4, wherein the plurality of slits are between 0.04 and 0.1875 inch wide.

12. The animation illusion device of claim 4, wherein the dome is made of plastic.

13. An animation illusion device comprising:
    a hollow dome with a top, a hollow inside the dome, and an inner surface;
    a plurality of slits;
    a light;
    an animation surface; and
    subjects of animation;

wherein the plurality of slits are spaced vertically around a periphery of the dome, wherein the light is disposed within the dome to illuminate the interior of the dome, wherein the subjects of animation are disposed on the animation surface, wherein the dome fits over the animation surface, wherein the animation surface with the subjects of animation covered by the dome have means by which the animation surface, the subjects of animation, and the dome can be rotated together, and wherein the plurality of slits function as shutters whereby, upon rotation, the subjects of animation, when viewed through the plurality of slits, create an illusion of natural and continuous animation;

a plurality of interlocking bricks adapted for construction of at least some of the animation illusion device, wherein one or more of the dome, the animation surface, and the subjects of animation are constructed with the interlocking bricks.

14. An animation illusion device comprising:

a hollow dome with a top, a hollow inside the dome, and an inner surface;

a plurality of slits;

a light;

an animation surface; and subjects of animation;

wherein the plurality of slits are spaced vertically around a periphery of the dome, wherein the light is disposed within the dome to illuminate the interior of the dome, wherein the subjects of animation are disposed on the animation surface, wherein the dome fits over the animation surface, wherein the animation surface with the subjects of animation covered by the dome have means by which the animation surface, the subjects of animation, and the dome can be rotated together, and wherein the plurality of slits function as shutters whereby, upon rotation, the subjects of animation, when viewed through the plurality of slits, create an illusion of natural and continuous animation;

wherein the dome at least partially polygonal with a plurality of faceted sides and with corners that converge in a gradual or stepped manner inwardly towards the top of the dome.

* * * * *